United States Patent
Nakahara et al.

(10) Patent No.: US 8,617,744 B2
(45) Date of Patent: Dec. 31, 2013

(54) ELECTRICITY STORAGE DEVICE

(75) Inventors: Kentaro Nakahara, Minato-ku (JP);
Shigeyuki Iwasa, Minato-ku (JP);
Masahiro Suguro, Minato-ku (JP);
Kazuaki Matsumoto, Minato-ku (JP);
Kaichiro Nakano, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/375,666

(22) PCT Filed: May 26, 2010

(86) PCT No.: PCT/JP2010/058875
§ 371 (c)(1),
(2), (4) Date: Dec. 1, 2011

(87) PCT Pub. No.: WO2010/140512
PCT Pub. Date: Dec. 9, 2010

(65) Prior Publication Data
US 2012/0100437 A1    Apr. 26, 2012

(30) Foreign Application Priority Data

Jun. 2, 2009  (JP) ................................ 2009-132950
Nov. 4, 2009  (JP) ................................ 2009-253029

(51) Int. Cl.
*H01M 10/0525* (2010.01)
(52) U.S. Cl.
USPC ...................................... 429/231.8

(58) Field of Classification Search
None
See application file for complete search history.

(56) References Cited

U.S. PATENT DOCUMENTS

2008/0226986 A1    9/2008   Nakahara et al.

FOREIGN PATENT DOCUMENTS

| JP | 2006-286919 A | 10/2006 |
|----|---------------|---------|
| JP | 2006-303330 A | 11/2006 |
| JP | 2007-213992 A | 8/2007  |
| JP | 2008-252013 A | 10/2008 |
| KE | 2002-304996 A | 10/2002 |
| WO | WO 2005/078830 A1 | 8/2005 |
| WO | WO 2008/059846 A1 | 5/2008 |

*Primary Examiner* — Patrick Ryan
*Assistant Examiner* — Wyatt McConnell
(74) *Attorney, Agent, or Firm* — Sughrue Mion, PLLC

(57) ABSTRACT

There can be provided an energy storage device comprising a positive electrode comprising a nitroxyl compound having a nitroxyl cation partial structure in an oxidized state and having a nitroxyl radical partial structure in a reduced state; a negative electrode comprising a carbon material which lithium ions can be reversibly intercalated into and deintercalated from; and an electrolytic solution comprising a lithium salt and an aprotic organic solvent, wherein the negative electrode is a negative electrode comprising the carbon material which lithium ions are previously intercalated into, apart from lithium ions associated with a capacity A of lithium capable of being intercalated and deintercalated in charge and discharge, thereby allowing the energy storage device to simultaneously achieve high energy density, high output characteristics, low environmental load, and high stability in charge and discharge cycles.

12 Claims, 2 Drawing Sheets

ELECTRICITY STORAGE DEVICE

CROSS REFERENCE TO RELATED APPLICATIONS

This application is a National Stage of International Application No. PCT/JP2010/058875 filed May 26, 2010, claiming priority based on Japanese Patent Application Nos. 2009-132950, filed Jun. 2, 2009 and 2009-253029, filed Nov. 4, 2009, the contents of all of which are incorporated herein by reference in their entirety.

TECHNICAL FIELD

The present invention relates to an energy storage device comprising a positive electrode comprising a nitroxyl compound, a negative electrode comprising a carbon material which lithium ions can be reversibly intercalated into and deintercalated from, and an electrolytic solution comprising an aprotic organic solvent in which a lithium salt is dissolved.

BACKGROUND ART

As global warming and environmental problems become serious, electric cars or hybrid electric cars are actively developed as clean automobiles replacing gasoline cars. Energy storage devices used for such applications are required to achieve both high energy density and high output characteristics, and at the same time, a durability of more than 10 years, high safety, and the like are required of the energy storage devices.

In order to achieve both high energy density and high output density, it is effective to increase operating voltage. Therefore, a negative electrode comprising a substance which lithium ions can be reversibly intercalated into and deintercalated from, and an electrolytic solution comprising an aprotic organic solvent comprising a lithium salt are used for these energy storage devices.

Examples of typical positive electrode materials used in these energy storage devices include transition metal oxides. This energy storage device is called a lithium ion secondary battery and is characterized by having very high energy density. In recent years, the output characteristics have also been improved, and both improved output characteristics and high energy density have been achieved. However, the problem of a decrease in safety due to thermal runaway, the problem of a rise in price due to the shortage of resources, the problem of environmental load, and the like remain, and the energy storage device has not been widely put to practical use for automobiles.

Examples of another positive electrode material replacing transition metal oxides include activated carbon. These energy storage devices using activated carbon for the positive electrode are called lithium ion capacitors. Since the energy storage device stores a charge by the electrostatic mechanism of an electric double layer, the energy storage device is characterized in that although the energy density is small, the output density is high, and the cycle stability is also high. There are no problems of resources and safety as in transition metal oxides. The technique of predoping the negative electrode with lithium ions by a chemical method or an electrochemical method is used to increase capacity, but still sufficient capacity is not obtained, and the energy storage device has not been widely put to practical use for automobiles so far (for example, see Patent Literatures 1 and 2).

In addition, a nitroxyl compound having an oxoammonium cation partial structure in an oxidized state and having a nitroxyl radical partial structure in a reduced state is proposed as another positive electrode material replacing transition metal oxides. This energy storage device is called an organic radical secondary battery and is known as a battery that exhibits high output characteristics, has small environmental load, and is safe. But, sufficient cycle stability is not obtained, and therefore, the energy storage device has not been widely put to practical use so far, and further improvement is desired (for example, see Patent Literature 3).

As described above, it has been difficult so far to fabricate an energy storage device that satisfies sufficiently high energy density and output density, low environmental load, and cycle stability, as an energy storage device that can be widely put to practical use for automobiles.

CITATION LIST

Patent Literature

Patent Literature 1: JP2006-286919A
Patent Literature 2: JP2008-252013A
Patent Literature 3: JP2002-304996A

SUMMARY OF INVENTION

Technical Problem

It is an object of the present invention to provide an energy storage device that can simultaneously achieve high energy density, high output characteristics, low environmental load, and high stability in charge and discharge cycles.

Solution to Problem

An energy storage device according to the present invention is an energy storage device comprising a positive electrode comprising a nitroxyl compound having a nitroxyl cation partial structure represented by the following formula (I) in an oxidized state and having a nitroxyl radical partial structure represented by the following formula (II) in a reduced state; a negative electrode comprising a carbon material which lithium ions can be reversibly intercalated into and deintercalated from; and an electrolytic solution comprising a lithium salt and an aprotic organic solvent, wherein the negative electrode is a negative electrode comprising the carbon material which lithium ions are previously intercalated into, apart from lithium ions associated with a capacity A of lithium capable of being intercalated and deintercalated in charge and discharge.

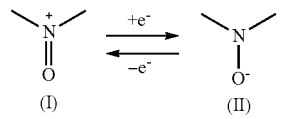

[Formula 1]

Advantageous Effect of Invention

The present invention can provide an energy storage device that simultaneously achieves high energy density, high output characteristics, low environmental load, and high stability in charge and discharge cycles.

DESCRIPTION OF EMBODIMENT

Next, an exemplary embodiment will be described with reference to the drawings.

Figure 1:
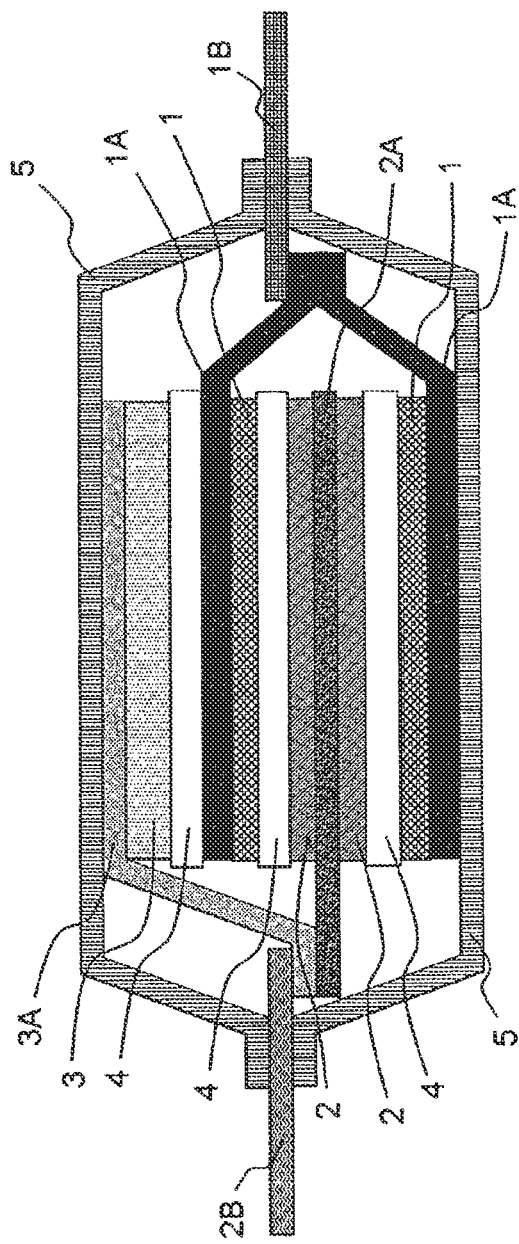
FIG. 1 is a cross-sectional view showing one example of the configuration of a laminate casing type energy storage device according to this exemplary embodiment.

An energy storage device in this exemplary embodiment will be described. FIG. 1 is a cross-sectional view of a laminate casing type energy storage device that is one example of the energy storage device according to this exemplary embodiment. For the basic configuration of the energy storage device in this exemplary embodiment shown in FIG. 1, the energy storage device comprises positive electrodes 1 comprising a nitroxyl compound, positive electrode current collectors 1A connected to the positive electrodes 1, and a positive electrode lead 1B, connected to the positive electrode current collectors 1A, for extracting energy from the cell. In addition, the energy storage device comprises negative electrodes 2 comprising a carbon material which lithium ions can be reversibly intercalated into and deintercalated from, a negative electrode current collector 2A connected to the negative electrodes 2, and a negative electrode lead 2B, connected to the negative electrode current collector 2A, for extracting energy from the cell. Further, the energy storage device comprises a lithium supply source 3 for predoping the negative electrodes 2, a lithium supply source current collector 3A connected to the lithium supply source 3, separators 4 that lie between the positive electrodes 1 and the negative electrodes 2 and between the lithium supply source 3 and the positive electrode current collector 1A, and do not conduct electrons and conduct only ions, and a casing body 5 sealing these.

The shape of the energy storage device in this exemplary embodiment is not particularly limited. A cylindrical type, a rectangular type, or the like can be appropriately selected according to the use. For the number of layers of electrodes, a single layer or a plurality of layers may be used. The way of laying in the case of a plurality of layers may be a lamination type or a rolling type.

The positive electrode 1 in this exemplary embodiment comprises a nitroxyl compound. The use of the nitroxyl compound can achieve safety and a reduction in environmental load. The nitroxyl compound in this exemplary embodiment is a compound having the nitroxyl cation partial structure represented by the above formula (I) in an oxidized state and having the nitroxyl radical partial structure represented by the above formula (II) in a reduced state.

The above nitroxyl compound is preferably a polymer compound having one cyclic structure selected from the group consisting of a 2,2,6,6-tetramethylpiperidinoxyl cation represented by the following formula (1), a 2,2,5,5-tetramethylpyrrolidinoxyl cation represented by the following formula (2), a 2,2,5,5-tetramethylpyrrolinoxyl cation represented by the following formula (3), and a nitronyl cation represented by the following formula (4), in an oxidized state, in terms of long-term stability. Particularly, polymer compounds having this cyclic nitroxyl structure in a side chain, especially, (meth)acrylate polymers and vinyl ether polymers, are preferred.

[Formula 2]

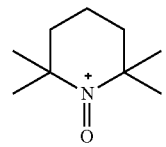

(1)

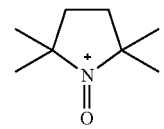

(2)

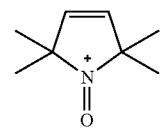

(3)

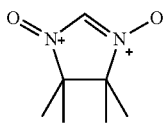

(4)

The main function of the nitroxyl compound in the positive electrode 1 is a role as an active material contributing to electrical storage. Therefore, as the proportion of the nitroxyl compound included in the positive electrode 1 is increased, the energy density is improved. The proportion of the nitroxyl compound included in the positive electrode 1 is not particularly limited. 1% by mass or more of the nitroxyl compound is preferably included in the positive electrode 1 because an effect corresponding to this is obtained. 10% by mass or more is more preferred because a sufficient effect is seen. When it is desired to obtain an electrical storage action as large as possible, 30% by mass or more of the nitroxyl compound is further preferably included, and 50% by mass or more is particularly preferred.

In addition, the above nitroxyl compound preferably has a crosslinked structure in terms of stability in charge and discharge cycles. The degree of crosslinking of the nitroxyl compound having the above crosslinked structure is preferably 0.5 to 6.0 mol %. The degree of crosslinking in the above range can further improve the stability in charge and discharge cycles.

The crosslinking agent used for the formation of the crosslinked structure of the nitroxyl compound having the above crosslinked structure is not particularly limited. But, a crosslinking agent having either one or both of a straight-chain alkylene group having 2 to 12 carbon atoms and an ethylene oxide group represented by the following formula (5) is preferably used.

$$-(CH_2-CH_2)_n- \quad (5)$$

wherein n=1 to 3.

The positive electrode 1 in this exemplary embodiment may further comprise a conductive auxiliary agent, a binder, and the like. Examples of the conductive auxiliary agent include carbon materials, such as carbon black, acetylene black, and carbon fibers, and conductive polymers, such as polyacetylene, polyphenylene, polyaniline, and polypyrrole. Examples of the binder can include resins, such as polyvinylidene fluoride, polytetrafluoroethylene, a vinylidene fluoride-hexafluoropropylene copolymer, a styrene-butadiene copolymerized rubber, polypropylene, polyethylene, and polyimide.

Examples of the material of the positive electrode current collector 1A can include aluminum, aluminum alloys, and stainless steel. As the shape, foil, a flat plate, and a mesh-like one can be used. Particularly, when the negative electrodes 2 are predoped with lithium ions, those provided with holes passing through the front and back surfaces are preferred. Examples thereof can include expanded metal, punched metal, a metal net, a foam, or porous foil provided with through holes by etching. The form, number, and the like of the through holes of the positive electrode current collector 1A can be appropriately set so that lithium ions in the electrolytic solution described later can move between the front and back of the electrode without being blocked by the positive electrode current collector 1A and so that the through holes are easily clogged by a conductive material. Examples of the material of the positive electrode lead 1B can include aluminum, aluminum alloys, and stainless steel. As the shape, foil, a flat plate, and a mesh-like one can be used.

The material of the negative electrode 2 in this exemplary embodiment comprises a carbon material which lithium ions can be reversibly intercalated into and deintercalated from. Specific examples of the carbon material include graphite, hard carbon, polyacene, and activated carbon. The negative electrode 2 in this exemplary embodiment may comprise a conductivity providing agent and a binder. Examples of the conductivity providing agent include carbon materials, such as carbon black, acetylene black, and carbon fibers, and metal powders. Examples of the binder include polyvinylidene fluoride, polytetrafluoroethylene, a vinylidene fluoride-hexafluoropropylene copolymer, a styrene-butadiene copolymerized rubber, polypropylene, polyethylene, and polyimide. In the energy storage device according to this exemplary embodiment, the use of the negative electrode 2 comprising the carbon material which lithium ions can be reversibly intercalated into and deintercalated from, and an electrolytic solution comprising a lithium salt and an aprotic organic solvent described later can increase the operating voltage of the energy storage device and can achieve both high energy density and output density.

The balance between the capacity A of lithium capable of being intercalated into and deintercalated from the negative electrodes 2 in charge and discharge and the capacity C of lithium capable of being intercalated into and deintercalated from the positive electrodes 1 in charge and discharge in this exemplary embodiment is not particularly limited. The capacity of lithium indicates the capacity of lithium ions. But, in order to obtain a sufficient capacity of the positive electrodes 1 in a state in which lithium ions are intercalated into the negative electrodes 2, during a discharged state in which the nitroxyl compound included in the positive electrode 1 has the nitroxyl radical partial structure, described later, it is preferred that the capacity A of lithium capable of being intercalated into and deintercalated from the negative electrodes 2 in charge and discharge is larger than the capacity C of lithium capable of being intercalated into and deintercalated from the positive electrodes 1 in charge and discharge. In order to achieve sufficient stability, the ratio of the above capacity A of lithium capable of being intercalated into and deintercalated from the negative electrodes 2 in charge and discharge to the above capacity C of lithium capable of being intercalated into and deintercalated from the positive electrodes 1 in charge and discharge, A/C, is preferably 1.1 or more, more preferably 1.5 or more. But, if the ratio of the above capacity A of lithium capable of being intercalated into and deintercalated from the negative electrodes 2 in charge and discharge to the above capacity C of lithium capable of being intercalated into and deintercalated from the positive electrodes 1 in charge and discharge, A/C, is too high, the energy density is lost, and therefore, the ratio A/C is preferably 10 or less, more preferably 5 or less.

The capacity A of lithium capable of being intercalated into and deintercalated from the negative electrodes 2 in charge and discharge is a value measured by fabricating a cell with a lithium metal counter electrode and repeating 10 times a cycle in which the cell is charged at a rate of $1/40$ C to 0 V versus lithium and discharged also at a rate of $1/40$ C to 1 V. In addition, the capacity C of lithium capable of being intercalated into and deintercalated from the positive electrodes 1 in charge and discharge is a value measured by fabricating a cell with a lithium metal counter electrode and repeating 10 times a cycle in which the cell is charged at a rate of $1/10$ C to 4 V versus lithium and discharged also at a rate of $1/10$ C to 3 V.

Examples of the material of the negative electrode current collector 2A can include copper, nickel, and stainless steel. As the shape, foil, a flat plate, and a mesh-like one can be used. Particularly, when the negative electrodes 2 are predoped with lithium ions, those provided with holes passing through the front and back surfaces are preferred. Examples thereof can include expanded metal, punched metal, a metal net, a foam, or porous foil provided with through holes by etching. The form, number, and the like of the through holes of the negative electrode current collector 2A can be appropriately set so that lithium ions in the electrolytic solution described later can move between the front and back of the electrode without being blocked by the negative electrode current collector 2A and so that the through holes are easily clogged by a conductive material. Examples of the material of the negative electrode lead 2B can include copper, nickel, and stainless steel. As the shape, foil, a flat plate, and a mesh-like one can be used.

The energy storage device in this exemplary embodiment is characterized by being in a state in which lithium ions are intercalated into and supported on the negative electrodes 2, during the discharged state in which the nitroxyl compound included in the positive electrode 1 has the nitroxyl radical partial structure represented by the above formula (II). In other words, the energy storage device in this exemplary embodiment is characterized in that even when the positive electrodes 1 are in a completely discharged state, that is, even when the positive electrodes 1 are in a state of not storing energy, lithium ions are still intercalated into and supported on the negative electrodes 2, and the energy storage device is in a partially charged state.

In order to be in this state, the energy storage device according to this exemplary embodiment is characterized in that the negative electrode 2 comprises the above carbon material which lithium ions are previously intercalated into, apart from lithium ions associated with the capacity A of lithium capable of being intercalated and deintercalated in charge and discharge. The energy storage device according to this exemplary embodiment is fabricated, for example, using for the positive electrode 1 a positive electrode comprising a nitroxyl compound having the nitroxyl radical partial structure represented by the above formula (II), and using for the negative electrode 2 a negative electrode comprising the above carbon material which lithium ions are previously intercalated into. In this manner, in this exemplary embodiment, apart from lithium ions derived from the lithium salt in the electrolytic solution, associated with charge and discharge, lithium ions are previously intercalated into the carbon material forming the negative electrode 2, for use as the negative electrode 2. By being in the above state, the energy storage device according to this exemplary embodiment can obtain excellent stability in charge and discharge cycles.

In the energy storage device in this exemplary embodiment, the capacity of lithium supported by the negative electrodes during the discharged state in which the nitroxyl compound included in the positive electrode 1 has the nitroxyl radical partial structure, that is, the capacity of lithium previously intercalated into the negative electrodes 2, is not particularly limited. But, in order to show the effect of a sufficient improvement in stability, lithium ions corresponding to preferably 10% or more, more preferably 40% or more, of the capacity A of lithium capable of being intercalated into and deintercalated from the negative electrodes 2 in charge and discharge are previously intercalated. If the capacity of lithium previously intercalated is too much, on the contrary, stability is impaired due to lithium dendrite growth. Therefore, the capacity of lithium previously intercalated is preferably 200% or less, more preferably 120% or less, of the capacity A of lithium capable of being intercalated into and deintercalated from the negative electrodes 2 in charge and discharge.

For the capacity of lithium previously intercalated into the negative electrodes 2, when the energy storage device is a laminate type battery, all lithium metal that is the lithium supply source 3 is intercalated into the carbon material, and therefore, the capacity of lithium previously intercalated can be calculated by measuring the weight of the lithium supply source 3 previously prepared in the cell. In the case of a coin type battery described later, lithium ions are intercalated under electrochemical control, and therefore, the capacity of lithium previously intercalated can be calculated from the accumulated value of current flowed through the cell.

In the energy storage device in this exemplary embodiment, the method for previously intercalating lithium ions into the negative electrodes 2, apart from lithium ions associated with the capacity A of lithium capable of being intercalated and deintercalated in charge and discharge, is not particularly limited. Examples of the method include a method of previously providing a lithium ion supply source in the energy storage device and electrochemically contacting the lithium ion supply source with the negative electrodes 2 to intercalate lithium ions, and a method of fabricating the energy storage device, using the negative electrodes 2 which lithium ions are previously intercalated into by an electrochemical method.

The lithium supply source 3 for previously intercalating lithium ions into the negative electrodes 2, apart from lithium ions associated with the capacity A of lithium capable of being intercalated and deintercalated in charge and discharge, is provided in the energy storage device shown in FIG. 1. All lithium metal of the lithium supply source 3 is intercalated into and supported on the above carbon material of the negative electrodes 2 as lithium ions by the electrical contact between the negative electrodes 2 and the lithium supply source 3. Thus, the energy storage device is designed to be in the state in which lithium ions are intercalated into and supported on the negative electrodes 2, during the discharged state in which the nitroxyl compound included in the positive electrode 1 has the nitroxyl radical partial structure represented by the above formula (II).

Examples of the material used as the lithium supply source 3 include lithium metal and a lithium-aluminum alloy. Particularly, lithium metal is preferred. Examples of the material of the lithium supply source current collector 3A can include copper, nickel, and stainless steel. As the shape, foil, a flat plate, and a mesh-like one can be used.

In the energy storage device in this exemplary embodiment, the amount of lithium ions capable of being supplied to the negative electrodes 2 by the lithium supply source 3 is not limited. But, as described above, in order to show the effect of a sufficient improvement in stability, lithium ions corresponding to preferably 10% or more, more preferably 40% or more, of the capacity A of lithium capable of being intercalated into and deintercalated from the negative electrodes 2 in charge and discharge are supplied, and intercalated and supported. If the amount of lithium ions supplied is too much, on the contrary, stability is impaired due to lithium dendrite growth. Therefore, lithium ions corresponding to preferably 200% or less, more preferably 120% or less, of the capacity A of lithium capable of being intercalated into and deintercalated from the negative electrodes 2 in charge and discharge are supplied, and intercalated and supported.

The separators 4 in FIG. 1 lie between the positive electrodes 1 and the negative electrodes 2 and between the lithium supply source 3 and the positive electrode current collector 1A, and play the role of not conducting electrons and conducting only ions. The separator 4 is not particularly limited, and those conventionally publicly known can be used. Examples thereof include porous films of polyolefins, such as polypropylene and polyethylene, and fluororesins. In addition, an aprotic organic solvent electrolyte comprising a lithium salt is held in the separator 4 and provides ion conduction. The aprotic organic solvent electrolyte comprising a lithium salt preferably has an ion conductivity of $10^{-5}$ to $10^{-1}$ S/cm at room temperature.

Examples of the lithium salt in this exemplary embodiment include $LiPF_6$, $LiClO_4$, $LiBF_4$, $LiSbF_6$, $LiN(CF_3SO_2)_2$, $LiN(C_2F_5SO_2)_2$, and $LiB(C_2O_4)_2$. Among the preferred as the lithium salt. These may be used singly or in combinations of two or more.

Examples of the aprotic organic solvent in this exemplary embodiment include cyclic carbonates, such as propylene carbonate (PC), ethylene carbonate (EC), butylene carbonate (BC), and vinylene carbonate (VC), chain carbonates, such as dimethyl carbonate (DMC), diethyl carbonate (DEC), ethyl methyl carbonate (EMC), and dipropyl carbonate (DPC), aliphatic carboxylates, such as methyl formate, methyl acetate, and ethyl propionate, lactones, such as γ-butyrolactone (GBL), chain ethers, such as dimethoxyethane (DME), diethoxyethane (DEE), and ethoxymethoxyethane (EME), cyclic ethers, such as tetrahydrofuran and methyltetrahydrofuran, and ion liquids, such as 1-ethyl-3-methylimidazolium TFSI and N-butyl-N-methylpyrrolidinium TFSI. Among these, DEC, EC, PC, BC, DME, and GBL are preferred as the aprotic organic solvent. These aprotic organic solvents may be used singly or in mixtures of two or more.

The concentration of the lithium salt with respect to the aprotic organic solvent is not particularly limited, and is preferably in the range of 0.4 to 1.5 mol/L in terms of showing sufficient ion conductivity.

The material of the casing body 5 is not particularly limited, and conventionally publicly known materials can be used. For example, metal materials, such as iron and aluminum, plastic materials, glass materials, or composite materials in which these are laminated, or the like can be used. But, in terms of the miniaturization of the energy storage device, a laminate film casing body in which aluminum and a polymer film, such as nylon or polypropylene, are laminated is preferred.

Figure 2:
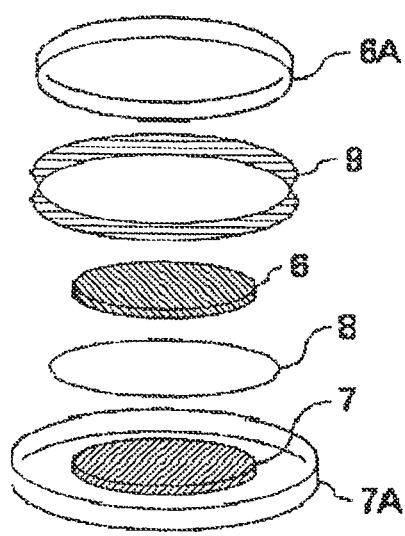
FIG. 2 is an exploded perspective view showing one example of the configuration of a coin casing type energy storage device according to this exemplary embodiment.

In addition, an exploded perspective view of a coin casing type energy storage device that is another example of the energy storage device according to this exemplary embodiment is shown in FIG. 2.

The basic configuration of the energy storage device comprises a positive electrode 6 containing the above nitroxyl compound, a separator 8 comprising porous polypropylene, cellulose, or the like, a negative electrode 7 comprising the above carbon material in which lithium ions are previously intercalated, a positive electrode current collector and casing body 6A connected to the positive electrode 6, a negative electrode current collector and casing body 7A connected to the negative electrode 7, an electrolytic solution comprising a lithium salt and an aprotic organic solvent, and an insulating packing 2 for preventing the electrical contact between the positive electrode 6 and the negative electrode 7.

The method for previously intercalating lithium ions into the negative electrode 7 and supporting the lithium ions on the negative electrode 7 is not particularly limited. For example, it is possible to dip the negative electrode 7 comprising the carbon material in an electrolytic solution, electrochemically intercalate lithium ions into the negative electrode 7, using lithium foil as a counter electrode, and support the lithium ions on the negative electrode 7. Other configurations, such as materials, are similar to those of the above-described laminate casing type energy storage device.

EXAMPLES

Specific examples of the energy storage device according to this exemplary embodiment will be shown below, but this exemplary embodiment is not limited to these.

Synthesis Example 1

Synthesis of Nitroxyl Compound (PTMA)

20 g (0.089 mol) of a 2,2,6,6-tetramethylpiperidine methacrylate monomer was placed in a 100 ml eggplant flask equipped with a reflux tube, and dissolved in 80 ml of dry tetrahydrofuran. 0.29 g (0.00187 mol) of azobisisobutyronitrile (AIBN) (monomer/AIBN mass ratio=50/1) was added thereto, and the mixture was stirred under an argon atmosphere at 75 to 80° C. After 6 hours of reaction, the material was allowed to cool to room temperature. The polymer was precipitated in hexane, filtered off, and dried under reduced pressure to obtain 18 g of poly(2,2,6,6-tetramethylpiperidine methacrylate) (yield: 90%). Next, 10 g of the obtained poly(2,2,6,6-tetramethylpiperidine methacrylate) was dissolved in 100 ml of dry dichloromethane. 100 ml of a solution of 15.2 g (0.088 mol) of m-chloroperbenzoic acid in dichloromethane was dropped therein with stirring at room temperature over 1 hour. The mixture was further stirred for 6 hours, and then, the precipitated m-chlorobenzoic acid was filtered off for removal. The filtrate was washed with an aqueous solution of sodium carbonate and water, and then, dichloromethane was distilled off. The remaining solid was ground, and the obtained powder was washed with diethyl carbonate (DEC), and dried under reduced pressure to obtain 7.2 g of poly(2,2,6,6-tetramethylpiperidinoxy radical methacrylate) (PTMA) represented by the following chemical formula (a) (yield: 68.2%, a brown powder). The structure of the obtained polymer was confirmed by IR. In addition, as a result of measurement by GPC, the values of a weight-average molecular weight Mw=89000 and a degree of dispersion Mw/Mn=3.30 were obtained.

[Formula 3]

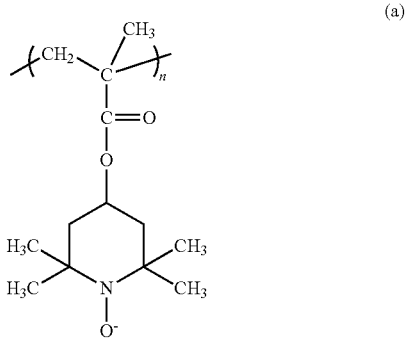

(a)

Synthesis Example 2

Synthesis of Nitroxyl Compound Having Crosslinked Structure (Crosslinked PTMA-1)

Crosslinking Agent: Ethylene Glycol Dimethacrylate
Degree of Crosslinking: 0.5 mol %

20 g (0.089 mol) of a 2,2,6,6-tetramethylpiperidine methacrylate monomer was placed in a 100 ml eggplant flask equipped with a reflux tube, and dissolved in 80 ml of dry tetrahydrofuran. 0.29 g (0.00187 mol) of azobisisobutyronitrile (AIBN) (monomer/AIBN mass ratio=50/1), and ethylene glycol dimethacrylate as the crosslinking agent were added thereto, and the mixture was stirred under an argon atmosphere at 75 to 80° C. After 6 hours of reaction, the material was allowed to cool to room temperature. The polymer was precipitated in hexane, filtered off, and dried under reduced pressure to obtain 18 g of poly(2,2,6,6-tetramethylpiperidine methacrylate) (yield: 90%). Next, 10 g of the obtained poly(2,2,6,6-tetramethylpiperidine methacrylate) was dissolved in 100 ml of dry dichloromethane. 100 ml of a solution of 15.2 g (0.088 mol) of m-chloroperbenzoic acid in dichloromethane was dropped therein with stirring at room temperature over 1 hour. The mixture was further stirred for 6 hours, and then, the precipitated m-chlorobenzoic acid was filtered off for removal. The filtrate was washed with an aqueous solution of sodium carbonate and water, and then, dichloromethane was distilled off. The remaining solid was ground, and the obtained powder was washed with diethyl carbonate (DEC), and dried under reduced pressure to obtain crosslinked poly(2,2,6,6-tetramethylpiperidinoxy radical methacrylate) (crosslinked PTMA-1) (yield: 77%, a brown powder). The structure of the obtained polymer was confirmed by IR. The obtained crosslinked product was insoluble in organic solvents, such as methanol, ethanol, acetone, ethyl acetate, tetrahydrofuran, dimethylformamide, and dimethyl sulfoxide.

Synthesis Examples 3 to 41

Synthesis of Nitroxyl Compounds Having Crosslinked Structure (Crosslinked PTMAs-2 to 40)

Crosslinked PTMAs were synthesized by an operation similar to that of the method for synthesizing crosslinked PTMA-1, using any of eight types, ethylene glycol dimethacrylate, butanediol dimethacrylate, hexanediol dimethacrylate, nonanediol dimethacrylate, decanediol dimethacrylate, dodecanediol dimethacrylate, diethylene glycol dimethacrylate, and triethylene glycol dimethacrylate, as the crosslinking agent, with a degree of crosslinking in the range of 0.5 to 6 mol %. The structure of the obtained polymers was confirmed by IR. The obtained crosslinked products were insoluble in methanol, ethanol, acetone, ethyl acetate, tetrahydrofuran, dimethylformamide, and dimethyl sulfoxide. PTMA and crosslinked PTMAs synthesized in Synthesis Examples 1 to 41 are shown in the following Table 1. The solubility in organic solvents indicates solubility in methanol, ethanol, acetone, ethyl acetate, tetrahydrofuran, dimethylformamide, and dimethyl sulfoxide. When PTMA or crosslinked PTMA was dissolved in any one of these, it was considered to be soluble.

TABLE 1

| Synthesis Example | Crosslinked product | Crosslinking agent | Degree of crosslinking (mol %) | Yield (%) | Solubility in organic solvents |
|---|---|---|---|---|---|
| Synthesis Example 1 | PTMA | None | — | 68 | Soluble |
| Synthesis Example 2 | Crosslinked PTMA-1 | Ethylene glycol dimethacrylate | 0.5 | 77 | Insoluble |
| Synthesis Example 3 | Crosslinked PTMA-2 | Ethylene glycol dimethacrylate | 1 | 80 | Insoluble |
| Synthesis Example 4 | Crosslinked PTMA-3 | Ethylene glycol dimethacrylate | 2 | 80 | Insoluble |
| Synthesis Example 5 | Crosslinked PTMA-4 | Ethylene glycol dimethacrylate | 4 | 83 | Insoluble |
| Synthesis Example 6 | Crosslinked PTMA-5 | Ethylene glycol dimethacrylate | 6 | 85 | Insoluble |
| Synthesis Example 7 | Crosslinked PTMA-6 | Butanediol dimethacrylate | 0.5 | 80 | Insoluble |
| Synthesis Example 8 | Crosslinked PTMA-7 | Butanediol dimethacrylate | 1 | 78 | Insoluble |
| Synthesis Example 9 | Crosslinked PTMA-8 | Butanediol dimethacrylate | 2 | 80 | Insoluble |
| Synthesis Example 10 | Crosslinked PTMA-9 | Butanediol dimethacrylate | 4 | 84 | Insoluble |
| Synthesis Example 11 | Crosslinked PTMA-10 | Butanediol dimethacrylate | 6 | 84 | Insoluble |
| Synthesis Example 12 | Crosslinked PTMA-11 | Hexanediol dimethacrylate | 0.5 | 75 | Insoluble |
| Synthesis Example 13 | Crosslinked PTMA-12 | Hexanediol dimethacrylate | 1 | 75 | Insoluble |
| Synthesis Example 14 | Crosslinked PTMA-13 | Hexanediol dimethacrylate | 2 | 74 | Insoluble |
| Synthesis Example 15 | Crosslinked PTMA-14 | Hexanediol dimethacrylate | 4 | 80 | Insoluble |
| Synthesis Example 16 | Crosslinked PTMA-15 | Hexanediol dimethacrylate | 6 | 86 | Insoluble |
| Synthesis Example 17 | Crosslinked PTMA-16 | Nonanediol dimethacrylate | 0.5 | 77 | Insoluble |
| Synthesis Example 18 | Crosslinked PTMA-17 | Nonanediol dimethacrylate | 1 | 76 | Insoluble |
| Synthesis Example 19 | Crosslinked PTMA-18 | Nonanediol dimethacrylate | 2 | 75 | Insoluble |
| Synthesis Example 20 | Crosslinked PTMA-19 | Nonanediol dimethacrylate | 4 | 79 | Insoluble |
| Synthesis Example 21 | Crosslinked PTMA-20 | Nonanediol dimethacrylate | 6 | 81 | Insoluble |
| Synthesis Example 22 | Crosslinked PTMA-21 | Decanediol dimethacrylate | 0.5 | 75 | Insoluble |
| Synthesis Example 23 | Crosslinked PTMA-22 | Decanediol dimethacrylate | 1 | 76 | Insoluble |
| Synthesis Example 24 | Crosslinked PTMA-23 | Decanediol dimethacrylate | 2 | 75 | Insoluble |
| Synthesis Example 25 | Crosslinked PTMA-24 | Decanediol dimethacrylate | 4 | 76 | Insoluble |
| Synthesis Example 26 | Crosslinked PTMA-25 | Decanediol dimethacrylate | 6 | 80 | Insoluble |
| Synthesis Example 27 | Crosslinked PTMA-26 | Dodecanediol dimethacrylate | 0.5 | 77 | Insoluble |
| Synthesis Example 28 | Crosslinked PTMA-27 | Dodecanediol dimethacrylate | 1 | 77 | Insoluble |
| Synthesis Example 29 | Crosslinked PTMA-28 | Dodecanediol dimethacrylate | 2 | 79 | Insoluble |
| Synthesis Example 30 | Crosslinked PTMA-29 | Dodecanediol dimethacrylate | 4 | 80 | Insoluble |
| Synthesis Example 31 | Crosslinked PTMA-30 | Dodecanediol dimethacrylate | 6 | 82 | Insoluble |
| Synthesis Example 32 | Crosslinked PTMA-31 | Diethylene glycol methacrylate | 0.5 | 74 | Insoluble |
| Synthesis Example 33 | Crosslinked PTMA-32 | Diethylene glycol methacrylate | 1 | 75 | Insoluble |
| Synthesis Example 34 | Crosslinked PTMA-33 | Diethylene glycol methacrylate | 2 | 74 | Insoluble |
| Synthesis Example 35 | Crosslinked PTMA-34 | Diethylene glycol methacrylate | 4 | 76 | Insoluble |
| Synthesis Example 36 | Crosslinked PTMA-35 | Diethylene glycol methacrylate | 6 | 80 | Insoluble |
| Synthesis Example 37 | Crosslinked PTMA-36 | Triethylene glycol dimethacrylate | 0.5 | 80 | Insoluble |
| Synthesis Example 38 | Crosslinked PTMA-37 | Triethylene glycol dimethacrylate | 1 | 82 | Insoluble |
| Synthesis Example 39 | Crosslinked PTMA-38 | Triethylene glycol dimethacrylate | 2 | 81 | Insoluble |
| Synthesis Example 40 | Crosslinked PTMA-39 | Triethylene glycol dimethacrylate | 4 | 82 | Insoluble |
| Synthesis Example 41 | Crosslinked PTMA-40 | Triethylene glycol dimethacrylate | 6 | 81 | Insoluble |

Synthesis Example 42

Synthesis of Nitroxyl Compound (PTVE)

Under an argon atmosphere, 10.0 g (50.4 mmol) of 2,2,6,6-tetramethylpiperidine-4-vinyl-1-oxyl (monomer) and 100 mL of dichloromethane were added to a 200 mL three-neck round bottom flask, and cooled to −78° C. Further, 280 mg (2 mmol) of a boron trifluoride-diethyl ether complex was added, and the mixture was made uniform, and then reacted at −30° C. for 20 hours. After the completion of the reaction, the obtained solid was washed with methanol several times, and vacuum-dried to obtain poly(2,2,6,6-tetramethylpiperidine-4-vinyl-1-oxyl) (PTVE) represented by the following chemical formula (b) (yield: 70%) as a red solid. The structure of the obtained polymer was confirmed by an IR spectrum. In addition, as a result of measuring the molecular weight of the DMF soluble portion by GPC, the values of a weight-average molecular weight Mw=66000 and a degree of dispersion Mw/Mn=2.4 were obtained. The glass transition temperature of this polymer was observed at 132° C.

[Formula 4]

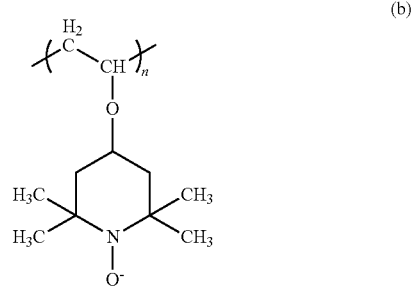

(b)

Synthesis Example 43

Synthesis of Nitroxyl Compound Having Crosslinked Structure (Crosslinked PTVE-1)

Crosslinking Agent: Ethylene Glycol Divinyl Ether
Degree of Crosslinking: 0.5 mol %

Under an argon atmosphere, 10.0 g (50.4 mmol) of 2,2,6,6-tetramethylpiperidine-4-vinyl-1-oxyl (monomer), ethylene glycol divinyl ether, and 100 mL of dichloromethane were added to a 200 mL three-neck round bottom flask, and cooled to −78° C. Further, 280 mg (2 mmol) of a boron trifluoride-diethyl ether complex was added, and the mixture was made uniform, and then reacted at −30° C. for 20 hours. After the completion of the reaction, the obtained solid was washed with methanol several times, and vacuum-dried to obtain crosslinked poly(2,2,6,6-tetramethylpiperidine-4-vinyl-1-oxyl) (crosslinked PTVE-1) (yield: 80%) as a red solid. The structure of the obtained polymer was confirmed by an IR spectrum. The glass transition temperature of the obtained crosslinked product was observed at 135° C.

Synthesis Examples 44 to 82

Synthesis of Nitroxyl Compounds Having Crosslinked Structure (Crosslinked PTVEs-2 to 40)

Crosslinked PTVEs were synthesized by an operation similar to that of the method for synthesizing crosslinked PTVE-1, using any of eight types, ethylene glycol divinyl ether, butanediol divinyl ether, hexanediol divinyl ether, nonanediol divinyl ether, decanediol divinyl ether, dodecanediol divinyl ether, diethylene glycol divinyl ether, and triethylene glycol divinyl ether, as the crosslinking agent, with a degree of crosslinking in the range of 0.5 to 6 mol %. The structure of the obtained polymers was confirmed by IR. The obtained crosslinked products were insoluble in methanol, ethanol, acetone, ethyl acetate, tetrahydrofuran, dimethylformamide, and dimethyl sulfoxide (organic solvents). PTVE and crosslinked PTVEs synthesized in Synthesis Examples 42 to 82 are shown in the following Table 2.

TABLE 2

| Synthesis Example | Crosslinked product | Crosslinking agent | Degree of crosslinking (mol %) | Yield (%) | Solubility in organic solvents |
|---|---|---|---|---|---|
| Synthesis Example 42 | PTVE | None | — | 70 | Soluble |
| Synthesis Example 43 | Crosslinked PTVE-1 | Ethylene glycol divinyl ether | 0.5 | 75 | Insoluble |
| Synthesis Example 44 | Crosslinked PTVE-2 | Ethylene glycol divinyl ether | 1 | 76 | Insoluble |
| Synthesis Example 45 | Crosslinked PTVE-3 | Ethylene glycol divinyl ether | 2 | 77 | Insoluble |
| Synthesis Example 46 | Crosslinked PTVE-4 | Ethylene glycol divinyl ether | 4 | 78 | Insoluble |
| Synthesis Example 47 | Crosslinked PTVE-5 | Ethylene glycol divinyl ether | 6 | 78 | Insoluble |
| Synthesis Example 48 | Crosslinked PTVE-6 | Butanediol divinyl ether | 0.5 | 75 | Insoluble |
| Synthesis Example 49 | Crosslinked PTVE-7 | Butanediol divinyl ether | 1 | 75 | Insoluble |
| Synthesis Example 50 | Crosslinked PTVE-8 | Butanediol divinyl ether | 2 | 76 | Insoluble |
| Synthesis Example 51 | Crosslinked PTVE-9 | Butanediol divinyl ether | 4 | 79 | Insoluble |
| Synthesis Example 52 | Crosslinked PTVE-10 | Butanediol divinyl ether | 6 | 79 | Insoluble |
| Synthesis Example 53 | Crosslinked PTVE-11 | Hexanediol divinyl ether | 0.5 | 80 | Insoluble |
| Synthesis Example 54 | Crosslinked PTVE-12 | Hexanediol divinyl ether | 1 | 80 | Insoluble |
| Synthesis Example 55 | Crosslinked PTVE-13 | Hexanediol divinyl ether | 2 | 79 | Insoluble |
| Synthesis Example 56 | Crosslinked PTVE-14 | Hexanediol divinyl ether | 4 | 81 | Insoluble |
| Synthesis Example 57 | Crosslinked PTVE-15 | Hexanediol divinyl ether | 6 | 80 | Insoluble |
| Synthesis Example 58 | Crosslinked PTVE-16 | Nonanediol divinyl ether | 0.5 | 76 | Insoluble |
| Synthesis Example 59 | Crosslinked PTVE-17 | Nonanediol divinyl ether | 1 | 74 | Insoluble |
| Synthesis Example 60 | Crosslinked PTVE-18 | Nonanediol divinyl ether | 2 | 77 | Insoluble |
| Synthesis Example 61 | Crosslinked PTVE-19 | Nonanediol divinyl ether | 4 | 81 | Insoluble |
| Synthesis Example 62 | Crosslinked PTVE-20 | Nonanediol divinyl ether | 6 | 81 | Insoluble |
| Synthesis Example 63 | Crosslinked PTVE-21 | Decanediol divinyl ether | 0.5 | 73 | Insoluble |
| Synthesis Example 64 | Crosslinked PTVE-22 | Decanediol divinyl ether | 1 | 73 | Insoluble |
| Synthesis Example 65 | Crosslinked PTVE-23 | Decanediol divinyl ether | 2 | 76 | Insoluble |
| Synthesis Example 66 | Crosslinked PTVE-24 | Decanediol divinyl ether | 4 | 75 | Insoluble |
| Synthesis Example 67 | Crosslinked PTVE-25 | Decanediol divinyl ether | 6 | 78 | Insoluble |

TABLE 2-continued

| Synthesis Example | Crosslinked product | Crosslinking agent | Degree of crosslinking (mol %) | Yield (%) | Solubility in organic solvents |
|---|---|---|---|---|---|
| Synthesis Example 68 | Crosslinked PTVE-26 | Dodecanediol divinyl ether | 0.5 | 72 | Insoluble |
| Synthesis Example 69 | Crosslinked PTVE-27 | Dodecanediol divinyl ether | 1 | 74 | Insoluble |
| Synthesis Example 70 | Crosslinked PTVE-28 | Dodecanediol divinyl ether | 2 | 74 | Insoluble |
| Synthesis Example 71 | Crosslinked PTVE-29 | Dodecanediol divinyl ether | 4 | 76 | Insoluble |
| Synthesis Example 72 | Crosslinked PTVE-30 | Dodecanediol divinyl ether | 6 | 80 | Insoluble |
| Synthesis Example 73 | Crosslinked PTVE-31 | Diethylene glycol divinyl ether | 0.5 | 76 | Insoluble |
| Synthesis Example 74 | Crosslinked PTVE-32 | Diethylene glycol divinyl ether | 1 | 75 | Insoluble |
| Synthesis Example 75 | Crosslinked PTVE-33 | Diethylene glycol divinyl ether | 2 | 77 | Insoluble |
| Synthesis Example 76 | Crosslinked PTVE-34 | Diethylene glycol divinyl ether | 4 | 83 | Insoluble |
| Synthesis Example 77 | Crosslinked PTVE-35 | Diethylene glycol divinyl ether | 6 | 83 | Insoluble |
| Synthesis Example 78 | Crosslinked PTVE-36 | Triethylene glycol divinyl ether | 0.5 | 75 | Insoluble |
| Synthesis Example 79 | Crosslinked PTVE-37 | Triethylene glycol divinyl ether | 1 | 75 | Insoluble |
| Synthesis Example 80 | Crosslinked PTVE-38 | Triethylene glycol divinyl ether | 2 | 80 | Insoluble |
| Synthesis Example 81 | Crosslinked PTVE-39 | Triethylene glycol divinyl ether | 4 | 81 | Insoluble |
| Synthesis Example 82 | Crosslinked PTVE-40 | Triethylene glycol divinyl ether | 6 | 82 | Insoluble |

<Fabrication of Positive Electrode (Polymer Content: 60% by Mass)>

3.6 g of the above nitroxyl compound previously pulverized, 2.1 g of vapor-grown carbon fibers, 240 mg of carboxymethyl cellulose, 60 mg of a polytetrafluoroethylene fine powder, and 24 g of water were mixed well to fabricate a slurry for a positive electrode. The above slurry for a positive electrode was applied to a 38 μm thick expanded metal aluminum current collector, and water was sufficiently vaporized, followed by overnight storage at 80° C. with vacuum drying to fabricate a positive electrode comprising 60% by mass of the nitroxyl compound. The thickness of the entire positive electrode including the current collector was 100 to 400 μm.

<Fabrication of Positive Electrode (Polymer Content: 70% by Mass)>

4.2 g of the above nitroxyl compound previously pulverized, 1.5 g of vapor-grown carbon fibers, 240 mg of carboxymethyl cellulose, 60 mg of a polytetrafluoroethylene fine powder, and 24 g of water were mixed well to fabricate a slurry for a positive electrode. The above slurry for a positive electrode was applied to a 38 μm thick expanded metal aluminum current collector, and water was sufficiently vaporized, followed by overnight storage at 80° C. with vacuum drying to fabricate a positive electrode comprising 70% by mass of the nitroxyl compound. The thickness of the entire positive electrode including the current collector was 100 to 400 μm.

<Fabrication of Positive Electrode (Polymer Content: 80% by Mass)>

4.8 g of the above nitroxyl compound previously pulverized, 0.9 g of vapor-grown carbon fibers, 240 mg of carboxymethyl cellulose, 60 mg of a polytetrafluoroethylene fine powder, and 24 g of water were mixed well to fabricate a slurry for a positive electrode. The above slurry for a positive electrode was applied to a 38 μm thick expanded metal aluminum current collector, and water was sufficiently vaporized, followed by overnight storage at 80° C. with vacuum drying to fabricate a positive electrode comprising 80% by mass of the nitroxyl compound. The thickness of the entire positive electrode including the current collector was 100 to 400 μm.

<Fabrication of Negative Electrode>

13.5 g of a graphite powder (particle diameter: 6 μm), 1.35 g of polyvinylidene fluoride, 0.15 g of carbon black, and 30 g of a N-methylpyrrolidone solvent were mixed well to fabricate a slurry for a negative electrode. The slurry for a negative electrode was applied to both surfaces of a 32 μm thick expanded metal copper foil coated with a carbon-based conductive paint, and vacuum-dried to fabricate a negative electrode comprising 90% by mass of graphite. The thickness of the entire negative electrode including the current collector was 50 to 120 μm.

Example 1

The laminate casing type energy storage device shown in FIG. 1 was fabricated using the positive electrodes comprising 70% by mass of the nitroxyl compound (PTMA), the above negative electrodes comprising 90% by mass of graphite, a mixed electrolytic solution of ethylene carbonate and diethyl carbonate, comprising a $LiPF_6$ supporting salt at a concentration of 1 mol/L, and a lithium foil that was a lithium supply source for predoping.

Specifically, in a dry room at a dew point of −60° C. or less, the positive electrodes 1 and the negative electrodes 2 were laid in order via the separators 4 to fabricate an electrode laminate. A lithium metal-bonded copper foil that was the lithium supply source 3 was intercalated into the uppermost portion of the electrode laminate. Aluminum foils that were the positive electrode current collectors 1A, and the positive electrode lead 1B were ultrasonically welded, and further, a copper foil that was the negative electrode current collector 2A a copper foil that was the lithium supply source current collector 3A, and the negative electrode lead 2B were similarly welded. They were covered with the casing body 5 comprising a 115 μm thick aluminum laminate film, and three sides including the lead portions were heat-sealed first. Next, a mixed electrolytic solution with ethylene carbonate/diethyl carbonate=3/7, comprising 1 mol/L of $LiPF_6$, was intercalated into the cell, and impregnated into the electrodes well. Finally, the last fourth side was heat-sealed under reduced pressure to fabricate the energy storage device. In addition, the negative electrodes 2 were electrically contacted with the lithium foil that was the lithium supply source 3 to previously intercalate lithium ions into the negative electrodes 2.

In the energy storage device, the film thickness of the electrodes was adjusted so that the capacity of lithium intercalated into the negative electrodes during a discharged state in which the nitroxyl compound (PTMA) included in the positive electrode had the nitroxyl radical partial structure, that is, the capacity of lithium previously intercalated into the negative electrodes, was 60% of the capacity A of lithium capable of being intercalated into and deintercalated from the negative electrodes in charge and discharge. In addition, the film thickness of the electrodes was adjusted so that the ratio of the capacity A of lithium capable of being intercalated into and deintercalated from the negative electrodes in charge and discharge to the capacity C of lithium capable of being intercalated into and deintercalated from the positive electrodes in charge and discharge, A/C, was 3.0. The open-circuit electromotive force of the fabricated cell was 3.2 V. This cell was repeatedly charged and discharged at a current density of 0.5 mA/cm$^2$ and a voltage in the range of 3.0 to 4.0 V. After 500 cycles, the remaining capacity was 91% of the initial capacity. Further, for the capacity retention rate after 500 cycles at 50° C., the remaining capacity was 86% of the initial capacity.

Example 2

The above negative electrode comprising 90% by mass of graphite was dipped in a mixed electrolytic solution of ethylene carbonate and diethyl carbonate, comprising a LiPF$_6$ supporting salt at a concentration of 1 mol/L, and lithium ions were electrochemically intercalated into the negative electrode, using lithium foil as a counter electrode. The coin type energy storage device shown in FIG. 2 was fabricated using the thus obtained lithium ion-intercalated negative electrode, the positive electrode comprising 70% by mass of the nitroxyl compound (PTMA), and a mixed electrolytic solution of ethylene carbonate and diethyl carbonate, comprising a LiPF$_6$ supporting salt at a concentration of 1 mol/L. In the energy storage device, the film thickness of the electrodes was adjusted so that the capacity of lithium intercalated into the negative electrode during a discharged state in which PTMA included in the positive electrode had the nitroxyl radical partial structure, that is, the capacity of lithium previously intercalated into the negative electrode, was 60% of the capacity A of lithium capable of being intercalated into and deintercalated from the negative electrode in charge and discharge. In addition, the film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 3.0. The open-circuit electromotive force of the fabricated cell was 3.2 V. This cell was repeatedly charged and discharged at a current density of 0.5 mA/cm$^2$ and a voltage in the range of 3.0 to 4.0 V. After 500 cycles, the remaining capacity was 93% of the initial capacity. Further, for the capacity retention rate after 500 cycles at 50° C., the remaining capacity was 87% of the initial capacity.

Example 3

The film thickness of the electrodes was adjusted so that the capacity of lithium intercalated into the negative electrode during a discharged state in which the nitroxyl compound (PTMA) included in the positive electrode had the nitroxyl radical partial structure, that is, the capacity of lithium previously intercalated into the negative electrode, was 5% of the capacity A of lithium capable of being intercalated into and deintercalated from the negative electrode in charge and discharge. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 3.0. A coin type energy storage device was fabricated as in Example 2, except these. The open-circuit electromotive force of the fabricated cell was 2.7 V. This cell was repeatedly charged and discharged at a current density of 0.5 mA/cm$^2$ and a voltage in the range of 3.0 to 4.0 V. After 500 cycles, the remaining capacity was 63% of the initial capacity. Further, for the capacity retention rate after 500 cycles at 50° C., the remaining capacity was 55% of the initial capacity.

Example 4

The film thickness of the electrodes was adjusted so that the capacity of lithium intercalated into the negative electrode during a discharged state in which the nitroxyl compound (PTMA) included in the positive electrode had the nitroxyl radical partial structure, that is, the capacity of lithium previously intercalated into the negative electrode, was 10% of the capacity A of lithium capable of being intercalated into and deintercalated from the negative electrode in charge and discharge. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 3.0. A coin type energy storage device was fabricated as in Example 2, except these. The open-circuit electromotive force of the fabricated cell was 3.0 V. This cell was repeatedly charged and discharged at a current density of 0.5 mA/cm$^2$ and a voltage in the range of 3.0 to 4.0 V. After 500 cycles, the remaining capacity was 83% of the initial capacity. Further, for the capacity retention rate after 500 cycles at 50° C., the remaining capacity was 76% of the initial capacity.

Example 5

The film thickness of the electrodes was adjusted so that the capacity of lithium intercalated into the negative electrode during a discharged state in which the nitroxyl compound (PTMA) included in the positive electrode had the nitroxyl radical partial structure, that is, the capacity of lithium previously intercalated into the negative electrode, was 40% of the capacity A of lithium capable of being intercalated into and deintercalated from the negative electrode in charge and discharge. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 3.0. A coin type energy storage device was fabricated as in Example 2, except these. The open-circuit electromotive force of the fabricated cell was 3.1 V. This cell was repeatedly charged and discharged at a current density of 0.5 mA/cm$^2$ and a voltage in the range of 3.0 to 4.0 V. After 500 cycles, the remaining capacity was 92% of the initial capacity. Further, for the capacity retention rate after 500 cycles at 50° C., the remaining capacity was 84% of the initial capacity.

Example 6

The film thickness of the electrodes was adjusted so that the capacity of lithium intercalated into the negative electrode during a discharged state in which the nitroxyl compound (PTMA) included in the positive electrode had the nitroxyl radical partial structure, that is, the capacity of lithium previously intercalated into the negative electrode, was 120% of the capacity A of lithium capable of being intercalated into and deintercalated from the negative electrode in charge and discharge. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 3.0. A coin type energy storage device was fabricated as in Example 2, except these. The open-circuit electromotive force of the fabricated cell was 3.3 V. This cell was repeatedly charged and discharged at a current density of 0.5 mA/cm$^2$ and a voltage in the range of 3.0 to 4.0 V. After 500 cycles, the remaining capacity was 92% of the initial capacity. Further, for the capacity retention rate after 500 cycles at 50° C., the remaining capacity was 80% of the initial capacity.

Example 7

The film thickness of the electrodes was adjusted so that the capacity of lithium intercalated into the negative electrode during a discharged state in which the nitroxyl compound (PTMA) included in the positive electrode had the nitroxyl radical partial structure, that is, the capacity of lithium previously intercalated into the negative electrode, was 200% of the capacity A of lithium capable of being intercalated into and dedeintercalated from the negative electrode in charge and discharge. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 3.0. A coin type energy storage device was fabricated as in Example 2, except these. The open-circuit electromotive force of the fabricated cell was 3.3 V. This cell was repeatedly charged and discharged at a current density of 0.5 mA/cm$^2$ and a voltage in the range of 3.0 to 4.0 V. After 500 cycles, the remaining capacity was 85% of the initial capacity. Further, for the capacity retention rate after 500 cycles at 50° C., the remaining capacity was 76% of the initial capacity.

Example 8

The film thickness of the electrodes was adjusted so that the capacity of lithium intercalated into the negative electrode during a discharged state in which the nitroxyl compound (PTMA) included in the positive electrode had the nitroxyl radical partial structure, that is, the capacity of lithium previously intercalated into the negative electrode, was 250% of the capacity A of lithium capable of being intercalated into and deintercalated from the negative electrode in charge and discharge. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 3.0. A coin type energy storage device was fabricated as in Example 2, except these. The open-circuit electromotive force of the fabricated cell was 3.4 V. This cell was repeatedly charged and discharged at a current density of 0.5 mA/cm$^2$ and a voltage in the range of 3.0 to 4.0 V. After 500 cycles, the remaining capacity was 71% of the initial capacity. Further, for the capacity retention rate after 500 cycles at 50° C., the remaining capacity was 62% of the initial capacity.

Example 9

The film thickness of the electrodes was adjusted so that the capacity of lithium intercalated into the negative electrode during a discharged state in which the nitroxyl compound (PTMA) included in the positive electrode had the nitroxyl radical partial structure, that is, the capacity of lithium previously intercalated into the negative electrode, was 40% of the capacity A of lithium capable of being intercalated into and deintercalated from the negative electrode in charge and discharge. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 1.0. A coin type energy storage device was fabricated as in Example 2, except these. The open-circuit electromotive force of the fabricated cell was 3.2 V. This cell was repeatedly charged and discharged at a current density of 0.5 mA/cm$^2$ and a voltage in the range of 3.0 to 4.0 V. After 500 cycles, the remaining capacity was 23% of the initial capacity. Further, for the capacity retention rate after 500 cycles at 50° C., the remaining capacity was 11% of the initial capacity.

Example 10

The film thickness of the electrodes was adjusted so that the capacity of lithium intercalated into the negative electrode during a discharged state in which the nitroxyl compound (PTMA) included in the positive electrode had the nitroxyl radical partial structure, that is, the capacity of lithium previously intercalated into the negative electrode, was 40% of the capacity A of lithium capable of being intercalated into and deintercalated from the negative electrode in charge and discharge. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 1.1. A coin type energy storage device was fabricated as in Example 2, except these. The open-circuit electromotive force of the fabricated cell was 3.2 V. This cell was repeatedly charged and discharged at a current density of 0.5 mA/cm$^2$ and a voltage in the range of 3.0 to 4.0 V. After 500 cycles, the remaining capacity was 72% of the initial capacity. Further, for the capacity retention rate after 500 cycles at 50° C., the remaining capacity was 60% of the initial capacity.

Example 11

The film thickness of the electrodes was adjusted so that the capacity of lithium intercalated into the negative electrode during a discharged state in which the nitroxyl compound (PTMA) included in the positive electrode had the nitroxyl radical partial structure, that is, the capacity of lithium previously intercalated into the negative electrode, was 40% of the capacity A of lithium capable of being intercalated into and deintercalated from the negative electrode in charge and discharge. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 1.5. A coin type energy storage device was fabricated as in Example 2, except these. The open-circuit electromotive force of the fabricated cell was 3.2 V. This cell was repeatedly charged and discharged at a current density of 0.5 mA/cm$^2$ and a voltage in the range of 3.0 to 4.0 V. After 500 cycles, the

Example 12

The film thickness of the electrodes was adjusted so that the capacity of lithium intercalated into the negative electrode during a discharged state in which the nitroxyl compound (PTMA) included in the positive electrode had the nitroxyl radical partial structure, that is, the capacity of lithium previously intercalated into the negative electrode, was 60% of the capacity A of lithium capable of being intercalated into and deintercalated from the negative electrode in charge and discharge. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 5.0. A coin type energy storage device was fabricated as in Example 2, except these. The open-circuit electromotive force of the fabricated cell was 3.2 V. This cell was repeatedly charged and discharged at a current density of 0.5 mA/cm$^2$ and a voltage in the range of 3.0 to 4.0 V. After 500 cycles, the remaining capacity was 90% of the initial capacity. Further, for the capacity retention rate after 500 cycles at 50° C., the remaining capacity was 79% of the initial capacity.

Example 13

The film thickness of the electrodes was adjusted so that the capacity of lithium intercalated into the negative electrode during a discharged state in which the nitroxyl compound (PTMA) included in the positive electrode had the nitroxyl radical partial structure, that is, the capacity of lithium previously intercalated into the negative electrode, was 60% of the capacity A of lithium capable of being intercalated into and deintercalated from the negative electrode in charge and discharge. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 10.0. A coin type energy storage device was fabricated as in Example 2, except these. The open-circuit electromotive force of the fabricated cell was 3.1 V. This cell was repeatedly charged and discharged at a current density of 0.5 mA/cm$^2$ and a voltage in the range of 3.0 to 4.0 V. After 500 cycles, the remaining capacity was 85% of the initial capacity. Further, for the capacity retention rate after 500 cycles at 50° C., the remaining capacity was 71% of the initial capacity.

Example 14

The film thickness of the electrodes was adjusted so that the capacity of lithium intercalated into the negative electrode during a discharged state in which the nitroxyl compound (PTMA) included in the positive electrode had the nitroxyl radical partial structure, that is, the capacity of lithium previously intercalated into the negative electrode, was 60% of the capacity A of lithium capable of being intercalated into and deintercalated from the negative electrode in charge and discharge. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 15.0. A coin type energy storage device was fabricated as in Example 2, except these. The open-circuit electromotive force of the fabricated cell was 3.2 V. This cell was repeatedly charged and discharged at a current density of 0.5 mA/cm$^2$ and a voltage in the range of 3.0 to 4.0 V. After 500 cycles, the remaining capacity was 77% of the initial capacity. Further, for the capacity retention rate after 500 cycles at 50° C., the remaining capacity was 66% of the initial capacity.

Examples 15 to 76

Batteries (the coin type and the laminate type) were fabricated by methods similar to those of Examples 1 to 14, except that the crosslinked polymers (crosslinked PTMAs and crosslinked PTVEs) shown in the above Synthesis Examples were used as the nitroxyl compound, and further, any of an ethylene carbonate/diethyl carbonate mixed solvent, propylene carbonate, and γ-butyrolactone was used as the solvent of the electrolytic solution, and either of LiPF$_6$ and LiBF$_4$ was used as the supporting salt, and the batteries were evaluated.

Comparative Example 1

A laminate casing type energy storage device was fabricated as in Example 1, using the positive electrodes comprising 70% by mass of the nitroxyl compound (PTMA), the above negative electrodes comprising 90% by mass of graphite, and a mixed electrolytic solution of ethylene carbonate and diethyl carbonate, comprising a LiPF$_6$ supporting salt at a concentration of 1 mol/L, and not using a lithium foil that was a lithium supply source for predoping. Lithium ions were not previously intercalated into the negative electrodes, and therefore, in the energy storage device, lithium ions were not intercalated into the negative electrodes during a discharged state in which the nitroxyl compound (PTMA) included in the positive electrode had the nitroxyl radical partial structure. The film thickness of the electrodes was adjusted so that the ratio of the capacity A of lithium capable of being intercalated into and deintercalated from the negative electrodes in charge and discharge to the capacity C of lithium capable of being intercalated into and deintercalated from the positive electrodes in charge and discharge, A/C, was 1.0. The open-circuit electromotive force of the fabricated cell was –0.1 V. This cell was repeatedly charged and discharged at a current density of 0.5 mA/cm$^2$ and a voltage in the range of 3.0 to 4.0 V. After 500 cycles, the remaining capacity was 34% of the initial capacity. Further, for the capacity retention rate after 500 cycles at 50° C., the remaining capacity was 10% of the initial capacity.

Comparative Example 2

A coin type energy storage device was fabricated as in Example 2, using the positive electrode comprising 70% by mass of the nitroxyl compound (PTMA), the above negative electrode comprising 90% by mass of graphite, which lithium ions were not intercalated into, and a mixed electrolytic solution of ethylene carbonate and diethyl carbonate, comprising a LiPF$_6$ supporting salt at a concentration of 1 mol/L. Lithium ions were not previously intercalated into the negative electrode, and therefore, in the energy storage device, lithium ions were not intercalated into the negative electrode during a discharged state in which the nitroxyl compound (PTMA) included in the positive electrode had the nitroxyl radical partial structure. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 1.0. The open-circuit electromotive force of the fabricated cell was −0.2 V. This cell was repeatedly charged and discharged at a current density of 0.5 mA/cm² and a voltage in the range of 3.0 to 4.0 V. After 500 cycles, the remaining capacity was 24% of the initial capacity. Further, for the capacity retention rate after 500 cycles at 50° C., the remaining capacity was 8% of the initial capacity.

Comparative Example 3

A coin type energy storage device was fabricated as in Example 2, using the positive electrode comprising 70% by mass of the nitroxyl compound (PTMA), the above negative electrode comprising 90% by mass of graphite, which lithium ions were not intercalated into, and a mixed electrolytic solution of ethylene carbonate and diethyl carbonate, comprising a $LiPF_6$ supporting salt at a concentration of 1 mol/L. Lithium ions were not previously intercalated into the negative electrode, and therefore, in the energy storage device, lithium ions were not intercalated into the negative electrode during a discharged state in which the nitroxyl compound (PTMA) included in the positive electrode had the nitroxyl radical partial structure. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 3.0. The open-circuit electromotive force of the fabricated cell was −0.1 V. This cell was repeatedly charged and discharged at a current density of 0.5 mA/cm² and a voltage in the range of 3.0 to 4.0 V. After 500 cycles, the remaining capacity was 22% of the initial capacity. Further, for the capacity retention rate after 500 cycles at 50° C., the remaining capacity was 6% of the initial capacity.

Comparative Example 4

A coin type energy storage device was fabricated using the positive electrode comprising 70% by mass of the nitroxyl compound (PTVE), the negative electrode comprising 90% by mass of graphite, which lithium ions were not intercalated into, and a mixed electrolytic solution of ethylene carbonate and diethyl carbonate, comprising a $LiPF_6$ supporting salt at a concentration of 1 mol/L. Lithium ions were not previously intercalated into the negative electrode, and therefore, lithium ions were not intercalated into the negative electrode during a discharged state in which the nitroxyl compound (PTVE) included in the positive electrode had the nitroxyl radical partial structure. The film thickness of the electrodes was adjusted so that the ratio of the capacity A of lithium capable of being intercalated into and deintercalated from the negative electrode in charge and discharge to the capacity C of lithium capable of being intercalated into and deintercalated from the positive electrode in charge and discharge, A/C, was 1.0. The open-circuit electromotive force of the fabricated cell was −0.1 V. This cell was repeatedly charged and discharged at a current density of 0.5 mA/cm² and a voltage in the range of 3.0 to 4.0 V. After 500 cycles, the remaining capacity was 13% of the initial capacity. Further, for the capacity retention rate after 500 cycles at 50° C., the remaining capacity was 4% of the initial capacity.

The nitroxyl compounds (polymers) used in the energy storage devices fabricated in the Examples of Examples 1 to 72, and Comparative Examples 1 to 4, the device shape, the solvent and supporting salt of the electrolytic solution used, the polymer content, the capacity of lithium previously intercalated into the negative electrode(s) with respect to the lithium capacity A, the ratio of the lithium capacity A to the lithium capacity C (A/C), the open-circuit electromotive force, the remaining capacity after 500 cycles at room temperature, and the remaining capacity after 500 cycles at 50° C. are summarized in detail and shown in the following Table 3 and Table 4.

TABLE 3

| | Polymer | Device shape | Electrolytic solution | Polymer content (% by mass) | Capacity of lithium previously intercalated into negative electrode(s) with respect to lithium capacity A (%) | A/C | Open-circuit electromotive force (V) | Remaining capacity after 500 cycles at room temperature (%) | Remaining capacity after 500 cycles at 50° C. (%) |
|---|---|---|---|---|---|---|---|---|---|
| Example 1 | PTMA | Laminate | 1M $LiPF_6$ EC/DEC | 70 | 60 | 3 | 3.2 | 91 | 86 |
| Example 2 | PTMA | Coin type | 1M $LiPF_6$ EC/DEC | 70 | 60 | 3 | 3.2 | 93 | 87 |
| Example 3 | PTMA | Coin type | 1M $LiPF_6$ EC/DEC | 70 | 5 | 3 | 2.7 | 63 | 55 |
| Example 4 | PTMA | Coin type | 1M $LiPF_6$ EC/DEC | 70 | 10 | 3 | 3 | 83 | 76 |
| Example 5 | PTMA | Coin type | 1M $LiPF_6$ EC/DEC | 70 | 40 | 3 | 3.1 | 92 | 84 |
| Example 6 | PTMA | Coin type | 1M $LiPF_6$ EC/DEC | 70 | 120 | 3 | 3.3 | 92 | 80 |
| Example 7 | PTMA | Coin type | 1M $LiPF_6$ EC/DEC | 70 | 200 | 3 | 3.3 | 85 | 76 |
| Example 8 | PTMA | Coin type | 1M $LiPF_6$ EC/DEC | 70 | 250 | 3 | 3.4 | 71 | 62 |
| Example 9 | PTMA | Coin type | 1M $LiPF_6$ EC/DEC | 70 | 40 | 1 | 3.2 | 23 | 11 |
| Example 10 | PTMA | Coin type | 1M $LiPF_6$ EC/DEC | 70 | 40 | 1.1 | 3.2 | 72 | 60 |

TABLE 3-continued

| | Polymer | Device shape | Electrolytic solution | Polymer content (% by mass) | Capacity of lithium previously intercalated into negative electrode(s) with respect to lithium capacity A (%) | A/C | Open-circuit electromotive force (V) | Remaining capacity after 500 cycles at room temperature (%) | Remaining capacity after 500 cycles at 50° C. (%) |
|---|---|---|---|---|---|---|---|---|---|
| Example 11 | PTMA | Coin type | 1M LiPF$_6$ EC/DEC | 70 | 40 | 1.5 | 3.2 | 77 | 67 |
| Example 12 | PTNA | Coin type | 1M LiPF$_6$ EC/DEC | 70 | 60 | 5 | 3.2 | 90 | 79 |
| Example 13 | PTMA | Coin type | 1M LiPF$_6$ EC/DEC | 70 | 60 | 10 | 3.1 | 85 | 71 |
| Example 14 | PTMA | Coin type | 1M LiPF$_6$ EC/DEC | 70 | 60 | 15 | 3.2 | 77 | 66 |
| Example 15 | PTMA | Coin type | 1M LiPF$_6$ EC/DEC | 60 | 60 | 5 | 3.2 | 80 | 68 |
| Example 16 | PTMA | Coin type | 1M LiPF$_6$ EC/DEC | 80 | 60 | 5 | 3.2 | 74 | 62 |
| Example 17 | Crosslinked PTMA-1 | Coin type | 1M LiPF$_6$ EC/DEC | 70 | 60 | 5 | 3.2 | 82 | 75 |
| Example 18 | Crosslinked PTMA-2 | Coin type | 1M LiPF$_6$ EC/DEC | 70 | 60 | 5 | 3.2 | 85 | 78 |
| Example 19 | Crosslinked PTMA-3 | Coin type | 1M LiPF$_6$ EC/DEC | 70 | 60 | 5 | 3.2 | 85 | 78 |
| Example 20 | Crosslinked PTMA-4 | Coin type | 1M LiPF$_6$ EC/DEC | 70 | 60 | 5 | 3.2 | 84 | 77 |
| Example 21 | Crosslinked PTMA-5 | Coin type | 1M LiPF$_6$ EC/DEC | 70 | 60 | 5 | 3.2 | 86 | 79 |
| Example 22 | Crosslinked PTMA-1 | Coin type | 1M LiBF$_4$ EC/DEC | 70 | 60 | 5 | 3.2 | 83 | 76 |
| Example 23 | Crosslinked PTMA-2 | Coin type | 1M LiBF$_4$ EC/DEC | 70 | 60 | 5 | 3.2 | 86 | 79 |
| Example 24 | Crosslinked PTMA-3 | Coin type | 1M LiBF$_4$ EC/DEC | 70 | 60 | 5 | 3.2 | 87 | 80 |
| Example 25 | Crosslinked PTMA-4 | Coin type | 1M LiBF$_4$ EC/DEC | 70 | 60 | 5 | 3.2 | 86 | 77 |
| Example 26 | Crosslinked PTMA-5 | Coin type | 1M LiBF$_4$ EC/DEC | 70 | 60 | 5 | 3.2 | 88 | 81 |
| Example 27 | Crosslinked PTMA-1 | Coin type | 1M LiPF$_6$ PC | 70 | 60 | 5 | 3.4 | 77 | 70 |
| Example 28 | Crosslinked PTMA-2 | Coin type | 1M LiPF$_6$ PC | 70 | 60 | 5 | 3.4 | 79 | 72 |
| Example 29 | Crosslinked PTMA-3 | Coin type | 1M LiPF$_6$ PC | 70 | 60 | 5 | 3.4 | 78 | 71 |
| Example 30 | Crosslinked PTMA-4 | Coin type | 1M LiPF$_6$ PC | 70 | 60 | 5 | 3.4 | 84 | 77 |
| Example 31 | Crosslinked PTMA-5 | Coin type | 1M LiPF$_6$ PC | 70 | 60 | 5 | 3.4 | 84 | 75 |
| Example 32 | Crosslinked PTMA-1 | Coin type | 1M LiPF$_6$ GBL | 70 | 60 | 5 | 3.2 | 83 | 76 |
| Example 33 | Crosslinked PTMA-2 | Coin type | 1M LiPF$_6$ GBL | 70 | 60 | 5 | 3.2 | 86 | 79 |
| Example 34 | Crosslinked PTMA-3 | Coin type | 1M LiPF$_6$ GBL | 70 | 60 | 5 | 3.2 | 88 | 81 |
| Example 35 | Crosslinked PTMA-4 | Coin type | 1M LiPF$_6$ GBL | 70 | 60 | 5 | 3.2 | 90 | 82 |
| Example 36 | Crosslinked PTMA-5 | Coin type | 1M LiPF$_6$ GBL | 70 | 60 | 5 | 3.2 | 88 | 81 |
| Example 37 | Crosslinked PTMA-1 | Coin type | 1M LiBF$_4$ GBL | 70 | 60 | 5 | 3.2 | 84 | 77 |
| Example 38 | Crosslinked PTMA-2 | Coin type | 1M LiBF$_4$ GBL | 70 | 60 | 5 | 3.2 | 86 | 79 |
| Example 39 | Crosslinked PTMA-3 | Coin type | 1M LiBF$_4$ GBL | 70 | 60 | 5 | 3.2 | 87 | 81 |
| Example 40 | Crosslinked PTMA-4 | Coin type | 1M LiBF$_4$ GBL | 70 | 60 | 5 | 3.2 | 88 | 81 |
| Example 41 | Crosslinked PTMA-5 | Coin type | 1M LiBF$_4$ GBL | 70 | 60 | 5 | 3.2 | 90 | 80 |

TABLE 4

| | Polymer | Device shape | Electrolytic solution | Polymer content (% by mass) | Capacity of lithium previously intercalated into negative electrode(s) with respect to lithium capacity A (%) | A/C | Open-circuit electromotive force (V) | Remaining capacity after 500 cycles at room temperature (%) | Remaining capacity after 500 cycles at 50° C. (%) |
|---|---|---|---|---|---|---|---|---|---|
| Example 42 | Crosslinked PTMA-1 | Coin type | 1M LiBF$_4$ PC | 70 | 60 | 5 | 3.4 | 78 | 71 |
| Example 43 | Crosslinked PTMA-2 | Coin type | 1M LiBF$_4$ PC | 70 | 60 | 5 | 3.4 | 80 | 73 |
| Example 44 | Crosslinked PTMA-3 | Coin type | 1M LiBF$_4$ PC | 70 | 60 | 5 | 3.4 | 81 | 74 |
| Example 45 | Crosslinked PTMA-4 | Coin type | 1M LiBF$_4$ PC | 70 | 60 | 5 | 3.4 | 83 | 76 |
| Example 46 | Crosslinked PTMA-5 | Coin type | 1M LiBF$_4$ PC | 70 | 60 | 5 | 3.4 | 88 | 81 |
| Example 47 | Crosslinked PTMA-6 | Coin type | 1M LiPF$_6$ EC/DEC | 70 | 60 | 5 | 3.3 | 83 | 76 |
| Example 48 | Crosslinked PTMA-7 | Coin type | 1M LiPF$_6$ EC/DEC | 70 | 60 | 5 | 3.3 | 86 | 80 |
| Example 49 | Crosslinked PTMA-8 | Coin type | 1M LiPF$_6$ EC/DEC | 70 | 60 | 5 | 3.3 | 85 | 78 |
| Example 50 | Crosslinked PTMA-9 | Coin type | 1M LiPF$_6$ EC/DEC | 70 | 60 | 5 | 3.3 | 84 | 77 |
| Example 51 | Crosslinked PTMA-10 | Coin type | 1M LiPF$_6$ EC/DEC | 70 | 60 | 5 | 3.3 | 86 | 79 |
| Example 52 | Crosslinked PTMA-1 | Laminate | 1M LiPF$_6$ EC/DEC | 70 | 60 | 5 | 3.3 | 78 | 71 |

TABLE 4-continued

| | Polymer | Device shape | Electrolytic solution | Polymer content (% by mass) | Capacity of lithium previously intercalated into negative electrode(s) with respect to lithium capacity A (%) | A/C | Open-circuit electromotive force (V) | Remaining capacity after 500 cycles at room temperature (%) | Remaining capacity after 500 cycles at 50° C. (%) |
|---|---|---|---|---|---|---|---|---|---|
| Example 53 | Crosslinked PTMA-2 | Laminate | 1M LiPF$_6$ EC/DEC | 70 | 60 | 5 | 3.3 | 82 | 77 |
| Example 54 | Crosslinked PTMA-3 | Laminate | 1M LiPF$_6$ EC/DEC | 70 | 60 | 5 | 3.3 | 83 | 73 |
| Example 55 | Crosslinked PTMA-4 | Laminate | 1M LiPF$_6$ EC/DEC | 70 | 60 | 5 | 3.3 | 84 | 77 |
| Example 56 | Crosslinked PTMA-5 | Laminate | 1M LiPF$_6$ EC/DEC | 70 | 60 | 5 | 3.3 | 86 | 77 |
| Example 57 | Crosslinked PTVE-1 | Coin type | 1M LiPF$_6$ EC/DEC | 70 | 60 | 5 | 3.3 | 78 | 71 |
| Example 58 | Crosslinked PTVE-2 | Coin type | 1M LiPF$_6$ EC/DEC | 70 | 60 | 5 | 3.3 | 81 | 74 |
| Example 59 | Crosslinked PTVE-3 | Coin type | 1M LiPF$_6$ EC/DEC | 70 | 60 | 5 | 3.3 | 82 | 75 |
| Example 60 | Crosslinked PTVE-4 | Coin type | 1M LiPF$_6$ EC/DEC | 70 | 60 | 5 | 3.3 | 84 | 77 |
| Example 61 | Crosslinked PTVE-5 | Coin type | 1M LiPF$_6$ EC/DEC | 70 | 60 | 5 | 3.3 | 85 | 75 |
| Example 62 | Crosslinked PTVE-6 | Coin type | 1M LiPF$_6$ EC/DEC | 70 | 60 | 5 | 3.3 | 79 | 72 |
| Example 63 | Crosslinked PTVE-7 | Coin type | 1M LiPF$_6$ EC/DEC | 70 | 60 | 5 | 3.3 | 81 | 74 |
| Example 64 | Crosslinked PTVE-8 | Coin type | 1M LiPF$_6$ EC/DEC | 70 | 60 | 5 | 3.3 | 83 | 76 |
| Example 65 | Crosslinked PTVE-9 | Coin type | 1M LiPF$_6$ EC/DEC | 70 | 60 | 5 | 3.3 | 85 | 78 |
| Example 66 | Crosslinked PTVE-10 | Coin type | 1M LiPF$_6$ EC/DEC | 70 | 60 | 5 | 3.3 | 88 | 80 |
| Example 67 | Crosslinked PTVE-1 | Coin type | 1M LiPF$_6$ GBL | 70 | 60 | 5 | 3.2 | 80 | 73 |
| Example 68 | Crosslinked PTVE-2 | Coin type | 1M LiPF$_6$ GBL | 70 | 60 | 5 | 3.2 | 83 | 75 |
| Example 69 | Crosslinked PTVE-3 | Coin type | 1M LiPF$_6$ GBL | 70 | 60 | 5 | 3.2 | 83 | 75 |
| Example 70 | Crosslinked PTVE-4 | Coin type | 1M LiPF$_6$ GBL | 70 | 60 | 5 | 3.2 | 86 | 79 |
| Example 71 | Crosslinked PTVE-5 | Coin type | 1M LiPF$_6$ GBL | 70 | 60 | 5 | 3.2 | 89 | 81 |
| Example 72 | Crosslinked PTVE-1 | Coin type | 1M LiBF$_4$ GBL | 70 | 60 | 5 | 3.2 | 81 | 74 |
| Example 73 | Crosslinked PTVE-2 | Coin type | 1M LiBF$_4$ GBL | 70 | 60 | 5 | 3.2 | 83 | 76 |
| Example 74 | Crosslinked PTVE-3 | Coin type | 1M LiBF$_4$ GBL | 70 | 60 | 5 | 3.2 | 83 | 77 |
| Example 75 | Crosslinked PTVE-4 | Coin type | 1M LiBF$_4$ GBL | 70 | 60 | 5 | 3.2 | 87 | 77 |
| Example 76 | Crosslinked PTVE-5 | Coin type | 1M LiBF$_4$ GBL | 70 | 60 | 5 | 3.2 | 90 | 83 |
| Comparative Example 1 | PTMA | Laminate | 1M LiPF$_6$ EC/DEC | 70 | 0 | 1 | −0.1 | 34 | 10 |
| Comparative Example 2 | PTMA | Coin type | 1M LiPF$_6$ EC/DEC | 70 | 0 | 1 | −0.2 | 24 | 8 |
| Comparative Example 3 | PTMA | Coin type | 1M LiPF$_6$ EC/DEC | 70 | 0 | 3 | −0.1 | 22 | 6 |
| Comparative Example 4 | PTMA | Coin type | 1M LiPF$_6$ EC/DEC | 70 | 0 | 1 | −0.1 | 13 | 4 |

From the comparison of Example 1 with Comparative Example 1, and the comparison of Example 9 with Comparative Example 2, and further the comparison of Example 2 to Example 8 with Comparative Example 3, it has become clear that by being in a state in which lithium ions are intercalated into the negative electrode(s), during the discharged state in which the nitroxyl compound included in the positive electrode has the nitroxyl radical partial structure, the open-circuit electromotive force increases significantly, and the stability for charge and discharge cycles is improved. From the comparison of Example 2 to Example 8, it has been found that the proportion of the capacity of lithium previously intercalated into the negative electrode(s) to the lithium capacity A is preferably in the range of 10% or more and 200% or less, more preferably 40% or more and 120% or less. From the comparison of Example 2 and Examples 9 to 14, it has been found the ratio of the lithium capacity A to the lithium capacity C, A/C, is preferably in the range of 1.1 or more and 10.0 or less, more preferably in the range of 1.5 or more and 5.0 or less. From the results of Examples 17 to 76, it has become clear that even if the crosslinked polymers are used as the nitroxyl compound, the stability is improved. In addition, it has been shown that even if any of the ethylene carbonate/diethyl carbonate mixed solvent, propylene carbonate, and γ-butyrolactone is used as the solvent of the electrolytic solution, the stability is excellent. Further, it has also become clear that even if either of LiBF$_4$ and LiPF$_6$ is used as the supporting salt, the stability is excellent. In the comparison of Example 1 and Examples 52 to 56 with the other Examples, it has been shown that when not only the coin type cell but also the laminate cell is used as the shape of the device, the device has high stability.

This application claims priority to Japanese Patent Application No. 2009-132950 filed on Jun. 2, 2009, and Japanese Patent Application No. 2009-253029 filed on Nov. 4, 2009, the entire disclosure of which is incorporated herein.

The invention of this application has been described with reference to the exemplary embodiment and Examples, but the invention of this application is not limited to the above exemplary embodiment and Examples. Various changes that can be understood by those skilled in the art can be made in the configuration and details of the invention of this application within the scope of the invention of this application.

INDUSTRIAL APPLICABILITY

The energy storage device in the present invention can simultaneously achieve high energy density, high output characteristics, low environmental load, and high safety. Therefore, the energy storage device in the present invention can be used as driving or auxiliary electrical storage sources for electric cars, hybrid electric cars, or the like, power supplies for various portable electronic equipment of which high output is required, electrical storage apparatuses for various energies, such as solar energy and wind power generation, electrical storage sources for home electrical appliances, or the like.

REFERENCE SIGNS LIST 1 positive electrode
1A positive electrode current collector
1B positive electrode lead 2 negative electrode
2A negative electrode current collector
2B negative electrode lead
3 lithium supply source
3A lithium supply source current collector
4 separator
5 casing body
6 positive electrode
6A positive electrode current collector and casing body
7 negative electrode
7A negative electrode current collector and casing body
8 separator
9 insulating packing

The invention claimed is:

1. An energy storage device comprising:
a positive electrode comprising a nitroxyl compound having a nitroxyl cation partial structure represented by the following formula (I) in an oxidized state and having a nitroxyl radical partial structure represented by the following formula (II) in a reduced state;
a negative electrode comprising a carbon material, wherein lithium ions can be reversibly intercalated into and deintercalated from said carbon material; and
an electrolytic solution comprising a lithium salt and an aprotic organic solvent, wherein
the negative electrode is a negative electrode comprising the carbon material wherein lithium ions are previously intercalated into said carbon material, apart from lithium ions associated with a capacity A of lithium capable of being intercalated and deintercalated in charge and discharge, and
wherein a ratio of the capacity A of lithium capable of being intercalated into and deintercalated from the negative electrode in charge and discharge to a capacity C of lithium capable of being intercalated into and deintercalated from the positive electrode in charge and discharge, A/C, is in the range of $1.1 \leq A/C \leq 10$

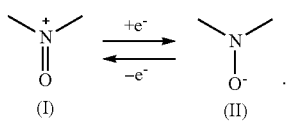

2. The energy storage device according to claim 1, wherein a capacity of lithium previously intercalated into the negative electrode is 10% or more and 200% or less of the capacity A of lithium capable of being intercalated into and deintercalated from the negative electrode in charge and discharge.

3. The energy storage device according to claim 1, wherein a capacity of lithium previously intercalated into the negative electrode is 40% or more and 120% or less of the capacity A of lithium capable of being intercalated into and deintercalated from the negative electrode in charge and discharge.

4. The energy storage device according to claim 1, wherein the ratio A/C is in the range of $1.5 \leq A/C \leq 5$.

5. The energy storage device according to claim 1, wherein a supply source of lithium ions previously intercalated into the negative electrode is provided in the energy storage device.

6. The energy storage device according to claim 5, wherein either one or both of the positive electrode and the negative electrode comprise a current collector having a hole passing through front and back surfaces, and lithium ions are previously intercalated into the negative electrode by electrochemical contact between the negative electrode and the supply source of lithium ions.

7. The energy storage device according to claim 1, wherein the nitroxyl compound is a polymer compound having one cyclic structure selected from the group consisting of a 2,2,6,6-tetramethylpiperidinoxyl cation represented by the following formula (1), a 2,2,5,5-tetramethylpyrrolidinoxyl cation represented by the following formula (2), a 2,2,5,5-tetramethylpyrrolinoxyl cation represented by the following formula (3), and a nitronyl cation represented by the following formula (4), in an oxidized state

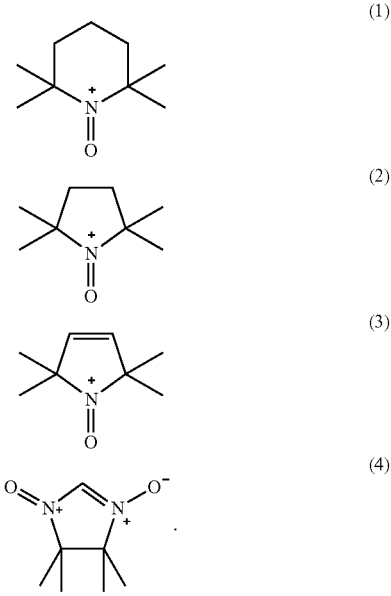

8. The energy storage device according to claim 1, wherein the nitroxyl compound has a crosslinked structure, and a degree of crosslinking is in the range of 0.5 to 6.0 mol %.

9. The energy storage device according to claim 8, wherein a crosslinking agent used for formation of the crosslinked structure has either one or both of a straight-chain alkylene group having 2 to 12 carbon atoms and an ethylene oxide group represented by the following formula (5):

$$—(CH_2—CH_2—O)_n— \quad (5)$$

wherein n=1 to 3.

10. The energy storage device according to claim 1, wherein the aprotic organic solvent is at least one compound selected from the group consisting of diethyl carbonate, ethylene carbonate, propylene carbonate, butylene carbonate, dimethoxyethane, and γ-butyrolactone.

11. The energy storage device according to claim 1, wherein the lithium salt is $LiBF_4$ or $LiPF_6$.

12. An energy storage device comprising:
a positive electrode comprising a nitroxyl compound having a nitroxyl cation partial structure represented by the following formula (1) in an oxidized state and having a nitroxyl radical partial structure represented by the following formula (II) in a reduced state;
a negative electrode comprising a carbon material, wherein lithium ions can be reversibly intercalated into and deintercalated from said carbon material; and
an electrolytic solution comprising a lithium salt and an aprotic organic solvent, the energy storage device being fabricated using for the positive electrode a positive electrode comprising a nitroxyl compound having the nitroxyl radical partial structure represented by the following formula (II), and a negative electrode comprising the carbon material into which lithium ions are previously intercalated

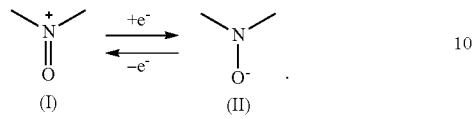

wherein a ratio of the capacity A of lithium capable of being intercalated into and deintercalated from the negative electrode in charge and discharge to a capacity C of lithium capable of being intercalated into and deintercalated from the positive electrode in charge and discharge, A/C, is in the range of $1.1 \leq A/C \leq 10$.

* * * * *

UNITED STATES PATENT AND TRADEMARK OFFICE
CERTIFICATE OF CORRECTION

| | | |
|---|---|---|
| PATENT NO. | : 8,617,744 B2 | Page 1 of 1 |
| APPLICATION NO. | : 13/375666 | |
| DATED | : December 31, 2013 | |
| INVENTOR(S) | : Kentaro Nakahara et al. | |

It is certified that error appears in the above-identified patent and that said Letters Patent is hereby corrected as shown below:

In the Specification

Column 8, Line 32: Delete "Among the" and insert -- Among these, $LiBF_4$ or $LiPF_6$ is --

In the Claims

Column 30, Line 60: Claim 12, delete "(1)" and insert -- (I) --

Signed and Sealed this
Eighteenth Day of November, 2014

Michelle K. Lee
*Deputy Director of the United States Patent and Trademark Office*